United States Patent
Despesse et al.

(10) Patent No.: US 10,615,703 B2
(45) Date of Patent: Apr. 7, 2020

(54) DC-DC CONVERTER

(71) Applicant: Commissariat à l'Énergie Atomique et aux Énergies Alternatives, Paris (FR)

(72) Inventors: Ghislain Despesse, Voreppe (FR); Benjamin Pollet, Grenoble (FR)

(73) Assignee: Commissariat à l'Énergie Atomique et aux Énergies Alternatives, Paris (FR)

(*) Notice: Subject to any disclaimer, the term of this patent is extended or adjusted under 35 U.S.C. 154(b) by 0 days.

(21) Appl. No.: 15/940,566

(22) Filed: Mar. 29, 2018

(65) Prior Publication Data
US 2018/0287503 A1 Oct. 4, 2018

(30) Foreign Application Priority Data
Mar. 29, 2017 (FR) .................. 17 52636

(51) Int. Cl.
*H02M 3/38* (2006.01)
*H02M 3/44* (2006.01)
*H02M 3/158* (2006.01)
*H02M 3/335* (2006.01)
*H02M 1/00* (2006.01)

(52) U.S. Cl.
CPC .......... *H02M 3/38* (2013.01); *H02M 3/1582* (2013.01); *H02M 3/335* (2013.01); *H02M 3/44* (2013.01); *H02M 2001/0067* (2013.01)

(58) Field of Classification Search
CPC ...... H02M 3/1582; H02M 3/335; H02M 3/44; H02M 3/38; H02M 2001/0067
See application file for complete search history.

(56) References Cited

U.S. PATENT DOCUMENTS

| 6,058,027 A | 5/2000 | Vargha et al. |
| 6,317,342 B1 | 11/2001 | Noworolski et al. |
| 10,199,555 B2* | 2/2019 | Chaput ................ H02M 3/335 |
| 2004/0095264 A1* | 5/2004 | Thomas ............... H02M 3/157 |
| | | 341/53 |
| 2013/0213677 A1* | 8/2013 | Zhamu ..................... B25F 5/00 |
| | | 173/1 |

(Continued)

FOREIGN PATENT DOCUMENTS

KR  10-2010-0137913 A  12/2010

OTHER PUBLICATIONS

FR 1752636, Dec. 21, 2017, International Search Report.
(Continued)

*Primary Examiner* — Adolf D Berhane
*Assistant Examiner* — Kevin H Sprenger
(74) *Attorney, Agent, or Firm* — Wolf, Greenfield & Sacks, P.C.

(57) ABSTRACT

A DC/DC converter, including a piezoelectric element; a first switch, coupling a first electrode of the piezoelectric element to a first terminal of application of a first voltage; a second switch, coupling the first electrode of the piezoelectric element to a first terminal of supply of a second voltage; and at least one third switch connecting the first electrode to a second electrode of the piezoelectric element, said switches being cyclically controlled, at an approximately constant frequency with, between each turning-on of one of the switches, a phase where all switches are off.

16 Claims, 4 Drawing Sheets

(56) References Cited

U.S. PATENT DOCUMENTS

| | | | | |
|---|---|---|---|---|
| 2014/0071722 A1* | 3/2014 | Gao | .................... | H02M 7/219 |
| | | | | 363/80 |
| 2014/0246908 A1* | 9/2014 | Chew | ................... | H02M 3/156 |
| | | | | 307/24 |
| 2015/0214841 A1* | 7/2015 | Ramorini | .............. | H02M 3/158 |
| | | | | 323/271 |
| 2016/0204717 A1* | 7/2016 | Li | .......................... | H02N 2/181 |
| | | | | 310/319 |
| 2018/0130940 A1* | 5/2018 | Chaput | ................. | H01L 41/042 |
| 2019/0044488 A1* | 2/2019 | Travis | ................... | H03F 3/2178 |

OTHER PUBLICATIONS

International Search Report for Application No. FR 1752636 dated Dec. 21, 2017.
Noworolski et al., Microresonant devices for power conversion. Proc. Optical Diagnostics of Living Cells II. Sep. 8, 1998;3514:260-5.
Tang et al., Laterally Driven Polysilicon Resonant Microstructures. Sensors and Actuators. Nov. 15, 1989;20(1):53-59.

* cited by examiner

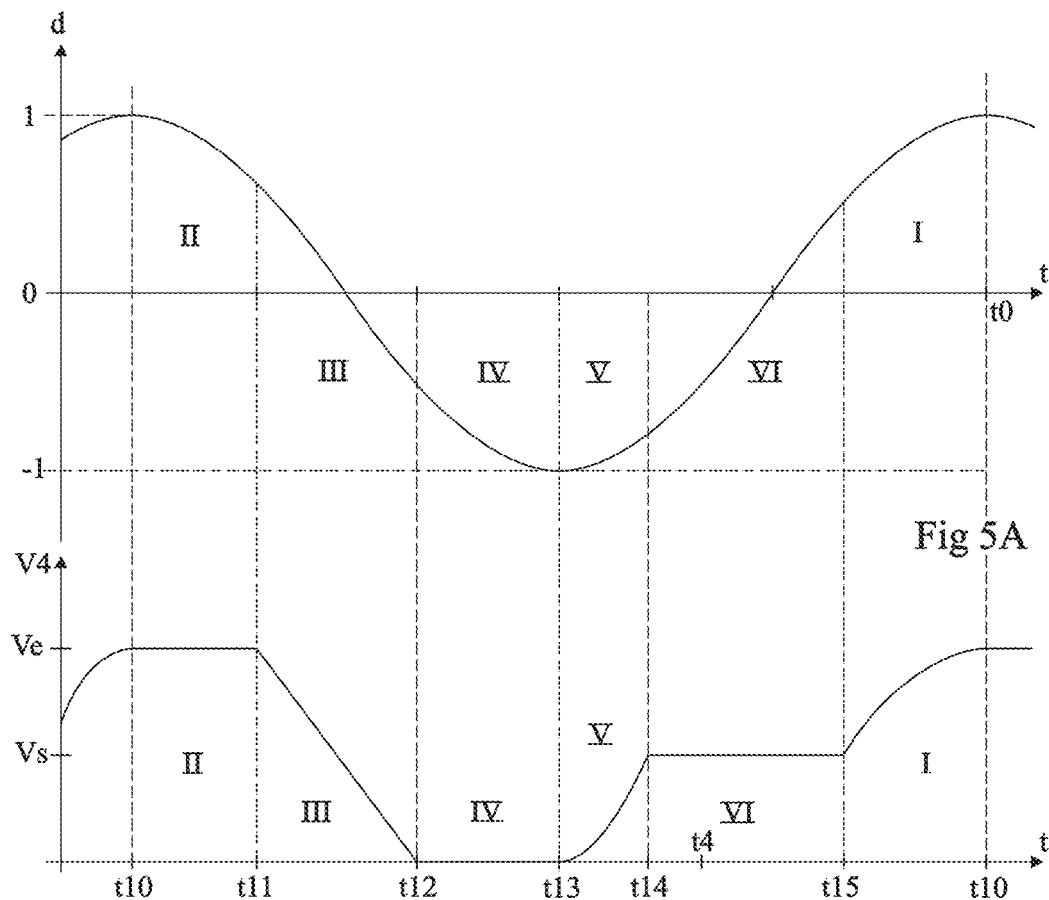
Fig 5A
Fig 5B
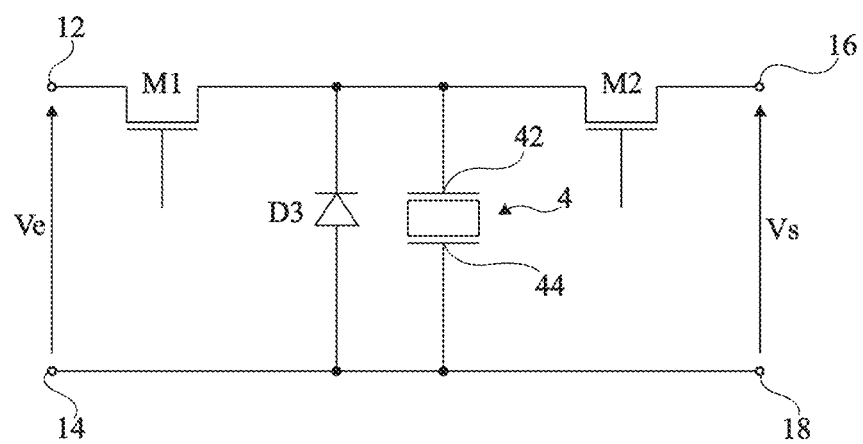
Fig 6

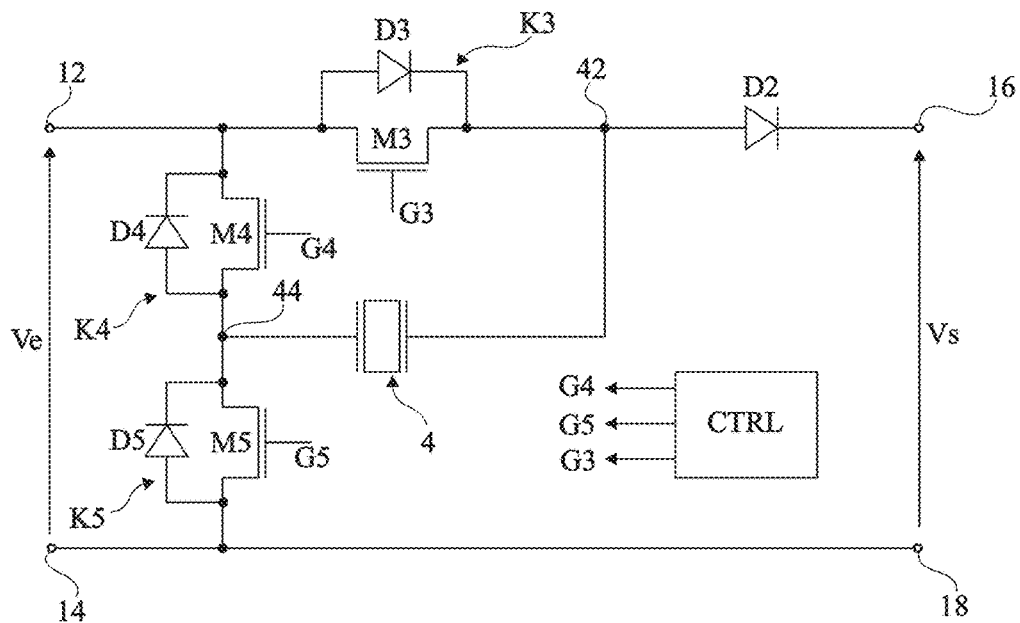
Fig 7
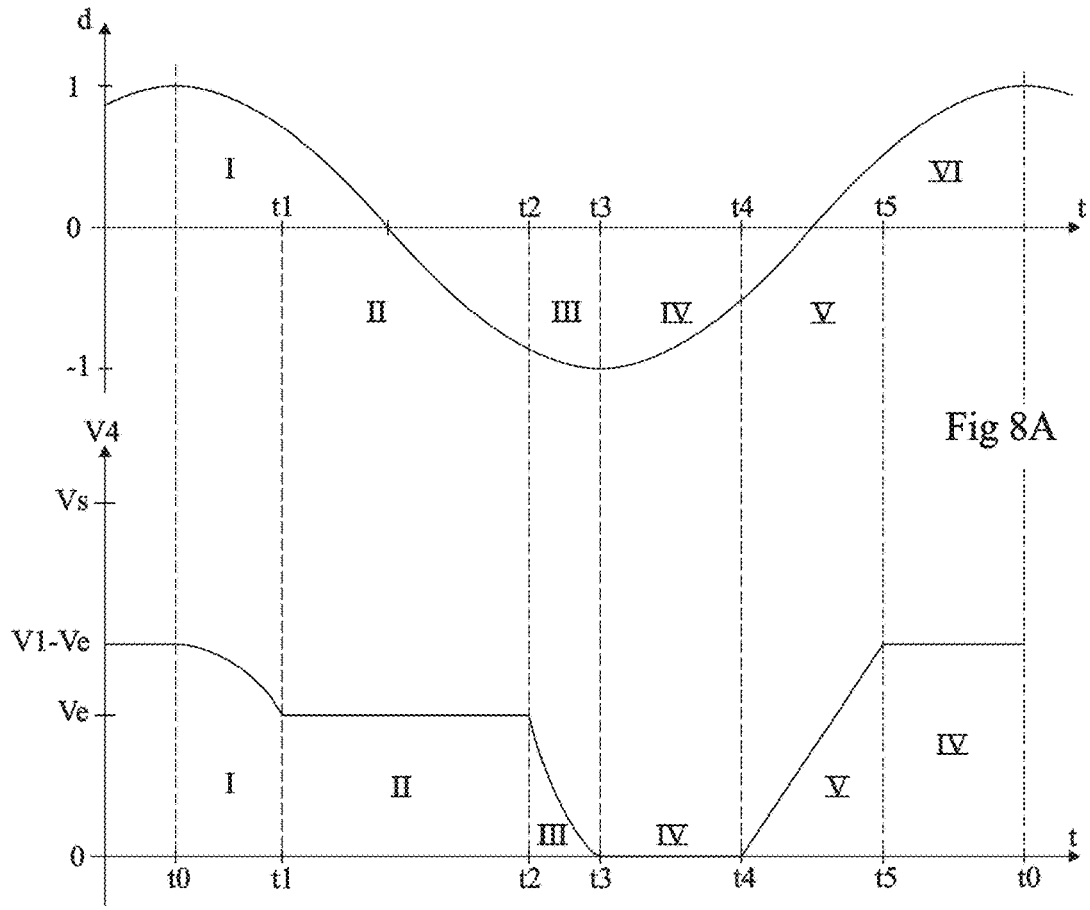
Fig 8A
Fig 8B

DC-DC CONVERTER

This application claims the priority benefit of French patent application number 17/52636, the content of which is hereby incorporated by reference in its entirety to the maximum extent allowable by law.

BACKGROUND

The present disclosure generally concerns electronic power conversion systems, and more particularly the forming of a DC/DC converter. The present disclosure more specifically concerns a DC/DC converter comprising a piezoelectric material.

DISCUSSION OF THE RELATED ART

The DC/DC power converters of electronic systems may be based on different principles.

A first category concerns converters based on the use of transformers. Most transformers are based on inductive windings, but piezoelectric transformers can also be found. The latter transform an AC voltage into another AC voltage with a different amplitude and require, like magnetic transformers, converting the DC input voltage into an AC voltage and then rectifying the AC voltage supplied by the transformer.

A second category concerns switched-mode power supplies which use an inductive power storage element and which cut off a DC input voltage, generally in pulse-width modulation, to regulate the value of a DC output voltage.

More recently, converters using the resonance of a piezoelectric material have appeared. In particular, document KR 20100137913 describes an example of a converter comprising a piezoelectric transducer where the output voltage is regulated by adjusting the frequency of phases at constant voltage and of phases at constant charge, as a switched-mode capacitance circuit.

Document U.S. Pat. No. 6,317,342 describes a power conversion system based on a microelectromechanical system.

SUMMARY

An embodiment overcomes all or part of the disadvantages of DC/DC converters.

An embodiment provides a solution using the advantages of piezoelectric materials.

An embodiment provides a solution enabling to regulate the output voltage of the converter according to the needs of the load.

According to an aspect, an embodiment provides a voltage boost converter.

According to another aspect, an embodiment provides a voltage buck converter.

An embodiment also provides a solution compatible with the forming of a buck-boost converter.

Thus an embodiment provides a DC/DC converter, comprising a piezoelectric element; a first switch, coupling a first electrode of the piezoelectric element to a first terminal of application of a first voltage; a second switch, coupling said first electrode of the piezoelectric element to a first terminal of supply of a second voltage; and at least one third switch connecting the first electrode to a second electrode of the piezoelectric element, said switches being cyclically controlled, at an approximately constant frequency with, between each turning-on of one of the switches, a phase where all the switches are off.

According to an embodiment, the turning-on of each switch is performed under an approximately zero voltage thereacross.

According to an embodiment, the second electrode of the piezoelectric element is connected to a second terminal of application of the first voltage and to a second terminal of supply of the second voltage.

According to an embodiment, a fourth switch couples the second electrode of the piezoelectric element to a second terminal of application of the first voltage and to a second terminal of supply of the second voltage.

According to an embodiment, in steady state, a control cycle comprises the successive steps of:
(I) turning off all the switches;
(II) turning on the first switch;
(III) turning off all the switches;
(IV) turning on the third switch;
(V) turning off all the switches; and
(VI) turning on the second switch.

According to an embodiment, the on phase of the third switch approximately starts at a time of maximum deformation of the piezoelectric element.

According to an embodiment, the on phase of the second switch approximately ends at a time of maximum deformation of the piezoelectric element.

According to an embodiment, the regulation of the second voltage is performed by adjusting the time at which the on phase of the third switch ends.

According to an embodiment, the second switch is a diode.

According to an embodiment, the on phase of the third switch approximately ends at a time of maximum deformation of the piezoelectric element.

According to an embodiment, the on phase of the first switch approximately starts at a time of maximum deformation of the piezoelectric element.

According to an embodiment, the regulation of the second voltage is performed by adjusting the time at which the on phase of the first switch ends.

According to an embodiment, the third switch is a diode.

An embodiment provides a method of controlling a DC/DC converter, comprising at least one piezoelectric element comprising, in steady state, the cyclic phases of:
connecting a first electrode of the piezoelectric element to a first terminal of application of a first DC voltage;
disconnecting the piezoelectric element by placing it in open circuit;
shorting the piezoelectric element;
disconnecting the piezoelectric element by placing it in open circuit;
connecting said first terminal of the piezoelectric element to a first terminal of supply of a second DC voltage;
disconnecting the piezoelectric element by placing it in open circuit.

According to an embodiment, the connection times then occur under an approximately zero voltage of a corresponding connection switch.

The foregoing and other features and advantages will be discussed in detail in the following non-limiting description of specific embodiments in connection with the accompanying drawings.

BRIEF DESCRIPTION OF THE DRAWINGS

FIGS. 5A and 5B illustrate, in simplified timing diagrams, the operation of the converter of FIG. 2 as a voltage buck converter;

FIG. 6 shows an example of an electric diagram of the buck converter using the principle of FIG. 2;

FIG. 7 very schematically shows another embodiment of a voltage boost DC/DC converter; and FIGS. 8A and 8B illustrate, in simplified timing diagrams, the operation of the converter of FIG. 7.

DETAILED DESCRIPTION

Figure 1:
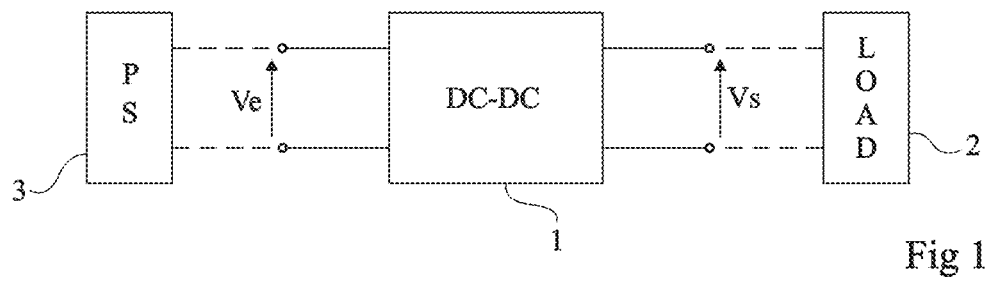
FIG. 1 is a simplified representation in the form of blocks of an example of a system using a DC/DC converter of the type to which the embodiments which will be described apply.

For clarity, only those elements which are useful to the understanding of the described embodiments have been shown and will be detailed. In particular, the forming and the structure of the circuits upstream and downstream of the described converter have not been detailed, the described embodiments being compatible with usual applications of such converters. It should be noted that, in the drawings, the structural and/or functional elements common to the different embodiments may be designated with the same reference numerals and may have identical structural, dimensional, and material properties. The terms "approximately", "substantially", and "in the order of" are used herein to designate a tolerance of plus or minus 10%, preferably of plus or minus 5%, of the value in question.

FIG. 1 is a simplified representation in the form of blocks of a system using a DC/DC converter of the type to which the embodiments which will be described apply.

A DC/DC converter 1 has the function of regulating a power supply voltage Vs of a load 2 to a stable value, by being powered from a power source 3 (PS) supplying a DC voltage (for example, a battery, a solar panel, etc.) Converter 1 may, according to applications, increase or lower the DC voltage Ve supplied by power source 3.

In a converter 1 of switched-mode power supply type based on an inductive power storage element, the converter control is generally performed in pulse-width modulation to control periods of power storage into the inductive element and of delivery of this power to the load. Such a control however cannot be transposed to a converter based on an element made of a piezoelectric material.

It would however be desirable to take advantage of the input voltage cut-off and power storage principles and to use them in a piezoelectric material to benefit from the advantages of piezoelectric materials, particularly in terms of low losses and of low bulk.

The solution described by document KR 20100137913 cannot be transposed either, since this solution provides regulating the output voltage by adjusting the switching frequency, which results in diverging from the resonance frequency of the piezoelectric material, and in a decrease of the quality factor and of the efficiency. Now, a piezoelectric material is precisely preferred to an inductance to take advantage of a better quality factor. Accordingly, this solution is in practice limited to applications where the load power varies little and to a factor two between the input voltage and the output voltage, otherwise the number of piezoelectric transducers should be multiplied, which then adversely affects the low bulk which, here again, is one of the advantages of a piezoelectric material over a magnetic material.

The described embodiments originate from an analysis of the operation of a piezoelectric material at the resonance to use charge transfer phases enabling not only to do away with the use of an inductive element, but also to regulate the output voltage while keeping the resonance of the piezoelectric material, that is, with switching cycles at constant frequency, where the durations of the respective switching phases within the cycle are adjusted.

More particularly, the mechanical oscillation of a piezoelectric element is approximately sinusoidal. An increase or a decrease of the power over a period respectively results in an increase or in a decrease of the oscillation amplitude. Further, in open circuit (at constant charge), an increase of the oscillation amplitude generates an increase in the voltage across the piezoelectric element, while, at constant voltage, such an oscillation amplitude increase results in an increase of the current.

Figure 2:
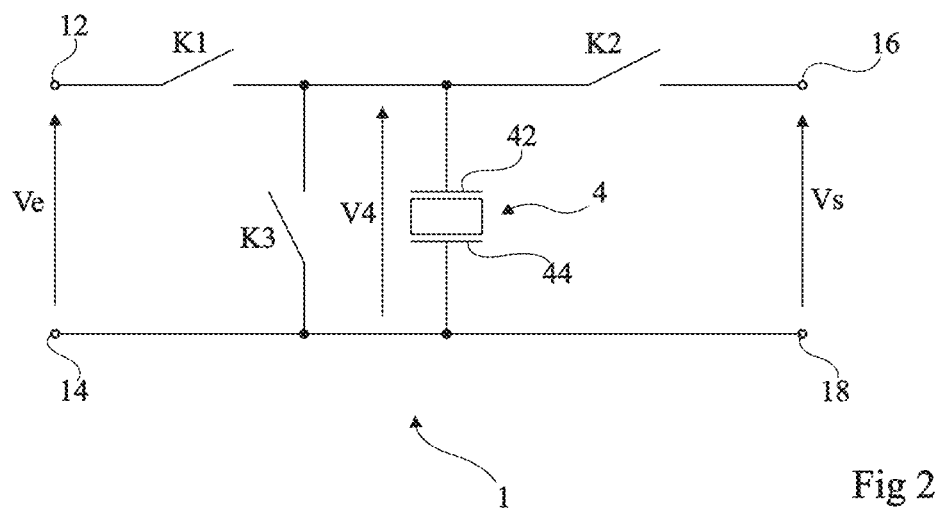
FIG. 2 very schematically shows an embodiment of a DC/DC converter using a piezoelectric element.

FIG. 2 very schematically shows an embodiment of a DC/DC converter 1 using a piezoelectric element.

According to an embodiment, a first electrode 42 of a piezoelectric element 4 is connected, by a switch K1, to a first terminal 12 of application of DC input voltage Ve and a second electrode 44 of piezoelectric element 4 is connected to a second terminal 14 of application of voltage Ve. The function of switch K1 is to control the phases where power is transferred from the power source (voltage Ve) to piezoelectric element 4.

First electrode 42 of piezoelectric element 4 is also connected, by a switch K2, to a first terminal 16 of supply of voltage Vs. In the example of FIG. 2, the second electrode 44 of piezoelectric element 4 is connected to a second terminal 18 of supply of voltage Vs, terminals 14 and 18 being thus confounded and defining the reference of voltages Ve and Vs. The function of switch K2 is to control phases where power is transferred from the piezoelectric element to the load (not shown in FIG. 2).

A difficulty which lies in the use of a piezoelectric material at the resonance is due to the fact that, during a cycle of mechanical oscillation of the piezoelectric material, the same quantity of power has to be both injected and removed, otherwise the amplitude oscillation will saturate (too much input power) or the oscillations will be damped (too much consumed power). In the first case, the quality factor and the efficiency are deteriorated. In the second case, the system ends up no longer operating. Now, the input and output voltages are different.

To address this constraint, a switch K3 is connected in parallel on piezoelectric element 4 (between terminals 42 and 44). The function of switch K3 is to allow a charge transfer under a fixed voltage (zero in the example of FIG. 2) different from voltages Ve and Vs.

Further, a specific control of the different switches is provided to respect, in steady state, the fact that over a deformation cycle of the piezoelectric material, that is, over an oscillation period and seen from the piezoelectric element, the sum of the charges exchanged with the outside is zero and the sum of the powers exchanged with the outside is zero (to within losses). Preferably, it is provided to turn on switches K1, K2, and K3 when the voltage between their respective terminals is substantially zero to limit losses.

Figure 3A:
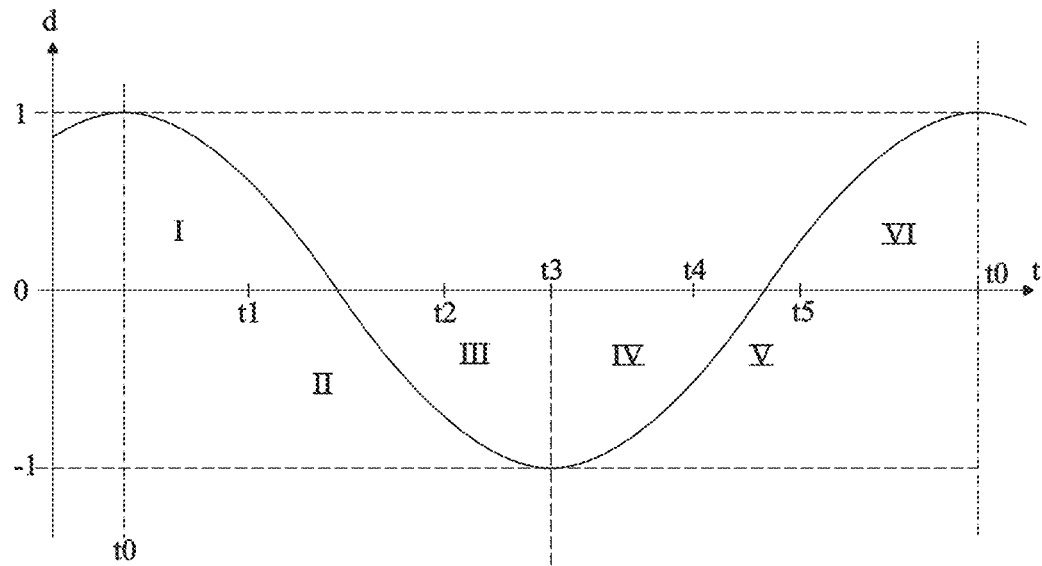
FIGS. 3A and 3B illustrate, in simplified timing diagrams, the operation of the converter of FIG. 2 as a voltage boost converter.
Figure 3B:
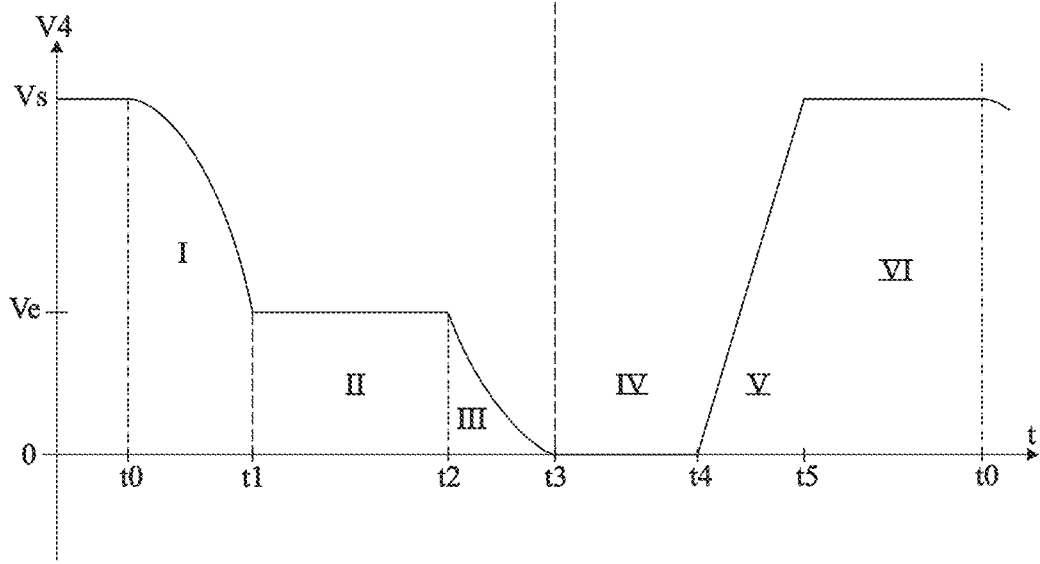

FIGS. 3A and 3B illustrate, in simplified timing diagrams, the operation of the converter of FIG. 2 as a voltage boost converter.

These drawings illustrate the operation in steady state, that is, from the moment that the resonance of the piezoelectric material has been reached with a substantially constant amplitude, that is, with power and charge exchanges substantially balanced over each period. There thus is an identity of the frequency of control cycles with the resonance frequency of the piezoelectric element. Thus, the converter operates at the resonance frequency of the piezoelectric element. To simplify the description, losses in the on switches and losses in the piezoelectric material at the resonance are neglected.

FIG. 3A illustrates the mechanical deformation of piezoelectric element 4 during a resonance cycle (one period). The deformation scale is normalized.

FIG. 3B illustrates a corresponding example of the shape of voltage V4 across piezoelectric element 4.

In steady state, phases during which all the switches are off and phases during which one of the switches is on alternate. During a cycle, each switch K1, K2, K3 is turned on during a phase.

When (time t0) element 4 is at its maximum deformation amplitude (1) in one direction, which amounts to a time when its current is zero, all the switches are turned off. Its deformation decreases and, therewith, voltage V4 thereacross. This corresponds to a phase (I) where it is operated at constant charge in piezoelectric element 4.

When (time t1) voltage V4 reaches value Ve of the input voltage, switch K1 is turned on and the two other switches remain off. A power transfer from the power source to element 4 can then be observed (phase II). Voltage V4 across element 4 is equal to input voltage Ve.

The power transfer carries on until a time t2 when switch K1 is turned back off. This then corresponds to a phase III where all the switches are off and at constant charge. This phase carries on until a time t3 when element 4 reaches its maximum deformation (−1) in the other direction.

At time t3, when voltage V4 is equal or close to 0 and, ideally, corresponds to its minimum value (zero crossing of the voltage derivative), switch K3 is turned on and a charge transfer between the electrodes of the piezoelectric element can be observed. The current in element 4 is also zero at time t3 since all the switches are off. This specific phase IV, which, in the example of FIGS. 2, 3A, and 3B, is carried out under a zero voltage, enables to preserve the balance of both the charges and the powers from the viewpoint of the piezoelectric element during a cycle.

At a time t4, switch K3 is made to turn off. This corresponds again to a phase V where all the switches are off. The oscillation of element 4 carries on off-load until a time t5 when the voltage thereacross reaches the value of output voltage Vs.

At this time t5, switch K2 is turned on and the power is transferred to the load connected to terminal 16.

The transfer carries on until the current in the piezoelectric material takes a zero value (time t0), which leads back to phase I where all the switches are off.

In the embodiment of FIG. 2, switch K2 may be a diode having its anode on the side of electrode 42 and its cathode on the side of terminal 16. Indeed, times t5 and t0 respectively of turning-on and of turning-off of switch K2 correspond to times when the anode-cathode voltage becomes positive (to within the junction voltage) and when the current in the diode takes a zero value. The rest of the time, the diode remains reverse-biased and switch K2 is thus off. Switch K2 may also be formed of a MOSFET transistor, which comprises a reverse diode. The reverse diode may provide the turning-on at time t5 and the turning-off at time t0, but the turning-on of the MOS transistor may be forced between these two times to decrease the voltage drop across switch K2, and thus the losses.

Switches K1 and K3 are controlled switches, for example, MOS transistors.

The detection of time t1 is for example performed by measurement of voltage V4 to turn on switch K1 when this voltage reaches value Ve. According to another embodiment, where the power or the current sampled by the load is measured or known, time t1 is determined by timing (for example, from the turning-off of switch K2 and the timing periods previously calculated according to the output current).

The determination of time t2 is for example performed by timing in an operation where the output power/current is measured or known. According to another embodiment, this time is determined with respect to the previous cycle by advancing it or delaying it according to whether at the previous cycle, voltage V4 was zero or not at the time of the turning-on of switch K3. A regulation of proportional-integral type may for example be used.

The determination of time t3 may be performed by timing (for example, by using a time counter or timer). Indeed, time t3 corresponds to the half-period from time t0. One may also detect the inversion from positive to negative of the derivative of voltage V4, or also use a sensor of the deformation limits of the piezoelectric material.

Time t4, and thus the duration of phase IV, conditions the quantity of charges which will be removed from the piezoelectric at zero voltage, that is, with no power retrieval from the piezoelectric. The longer phase IV, the less power is retrieved from the piezoelectric and the more a cycle with a positive energy balance is favored. The more positive the energy balance, the more the deformation amplitude of the piezoelectric increases from one cycle to another and the higher the output power/current will end up being. Indeed, during phase VI, the higher the current, the greater the quantity of charges transmitted to the output, all the more as the duration of phase VI increases at the same time as the duration of phase IV is increased (the increase of the deformation amplitude accelerates the voltage variation during phase V and thus shortens the duration of phase V, which in the end leaves more time available both for phase IV and for phase VI). The determination of time t4 is preferably performed by measuring output voltage Vs and by comparing it with a reference/set point value. The same type of control of time t4 may also be performed by regulating the output power or the output current.

Times t5 and t6 are preferably automatic in the case of the use of a diode as a switch K2. As a variation for time t5, one may measure the voltage across element 4 to detect when it reaches value Vs, or use a timer. For time t6, a detection of an inversion of the current direction, of a deformation limit of the piezoelectric material, a timer, etc. may be used.

Reference has been made hereabove to a zero voltage V4 at time t3. However, as a variation, the switching of time t3 does not occur under a zero voltage but for example under a negative (or positive) voltage. Thus, all that has been described in relation with time t3 and phase IV operates similarly if voltage V4 is not zero between times t3 and t4 but has a non-zero value Vb. In this case, electrode 44 is not confounded with terminals 14 and 18, unless an additional voltage source, itself referenced to electrode 44, is used, for example, a symmetrical+/−source Ve with a midpoint connected to electrode 44.

The operation described in relation with FIGS. 2 and 3A, 3B enables, over a cycle, in steady state, to have an energy balance between incoming and outgoing charges in piezoelectric element 4 as well as an energy balance between the input and output powers. In other words, designating with Qe the quantity of charges transferred from the power source (battery) into element 4 during phase II, with Qs the quantity of charges transferred from element 4 to load 2 during phase VI, and with Qb the quantity of charges in element 4 during phase IV, one may write:

Qe+Qb+Qs=0, taking as a convention that a positive value of Qe, Qb, or Qs induces charges in the same direction in element 4.

Further, one may also write:

$$Qe*Ve+Qb*Vb+Qs*Vs=0.$$

To start the system (transient state), only switches K1 and K3 are turned on, that is, only phases II, III, IV, and V are carried out until, for example, voltage V4 reaches the desired output value Vs. As a variation, it is passed to the six operating phases as soon as voltage V4 is greater than voltage Ve. In practice, if switch K2 is a diode, on turning-on of switch K1, voltage Vs will directly take the value of voltage Ve and then the boost mode with the six phases will be very rapidly reached. However, via the control, phase IV will be a little longer than normal to obtain a positive energy balance over each cycle in order to increase the amplitude of the deformation of the piezoelectric, to progressively enable voltage Vs to increase up to its set point value. Once the set point has been reached and if the output current is stable, the steady state is reached with a zero energy balance seen by the piezoelectric over a period. From this time, a steady state has been reached and the six phases of FIG. 3B take place. The end of the transient state occurs when output voltage Vs substantially reaches the desired value. It may be automatically come out of the transient state if switch K2 is a diode.

The fact of providing an operation at substantially constant frequency enables to keep an operation of the piezoelectric element at the resonance. This enables not to degrade its quality factor and thus to optimize the efficiency.

Another advantage of the above-described embodiments is that they are not limited to a specific factor between the value of the input voltage and that of the output voltage.

For a given piezoelectric material, its resonance frequency is known. According to its shape, the maximum amplitude of its oscillations before saturation is also known. This maximum amplitude has a corresponding maximum short-circuit current, which substantially provides the maximum current that can be output during phase VI. Similarly, the maximum amplitude has a corresponding maximum off-load voltage which substantially provides the maximum voltages that the input or output voltages may reach.

Figure 4:
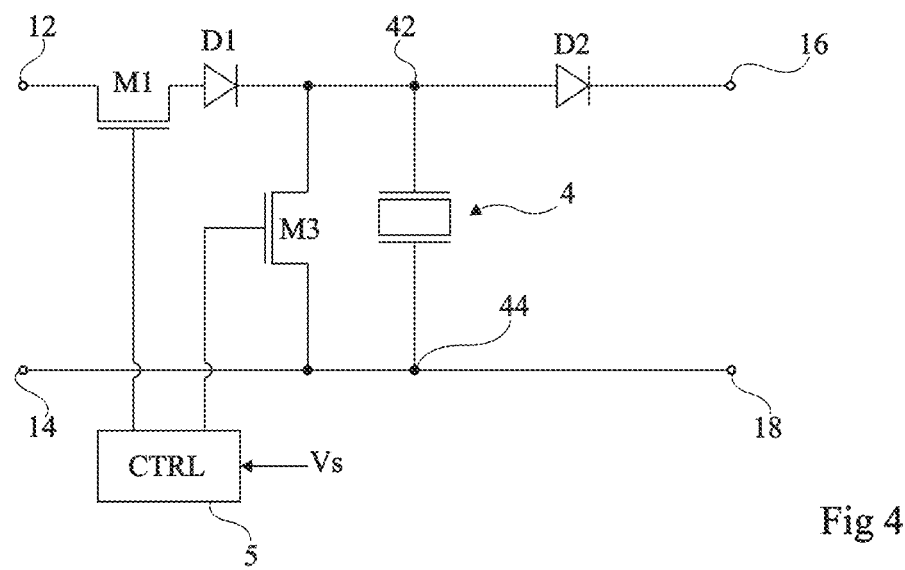
FIG. 4 shows an example of a simplified diagram of a boost converter using the principle of FIG. 2.

FIG. 4 shows an example of electric diagram of a boost converter using the principle of FIG. 2.

According to this example, switch K2 is formed of a simple diode D2. Switch K3 is formed of a MOS transistor M3 (bidirectional for current). Switch K1 is formed of a MOS transistor M1 in series with a diode D1 (anode on the side of terminal 12) to make it unidirectional for current and bidirectional for voltage. The transistors (switches) are controlled from a circuit 5 (CTRL) implementing the above-described functions and for example receiving information representative of voltage Vs.

FIGS. 5A and 5B illustrate the operation of the circuit of FIG. 2 as a voltage buck converter.

As for FIGS. 3A and 3B, these drawings illustrate the operation in steady state, that is, from the time when a deformation amplitude of the piezoelectric satisfying the power/current needs of the output has been reached. The frequency of the control cycles is adjusted to the resonance frequency of the piezoelectric element. Here again, to simplify the description, losses in the on switches and losses in the piezoelectric material at the resonance are neglected.

FIG. 5A illustrates the mechanical deformation of piezoelectric element 4 during a resonance cycle (one period). The deformation scale is normalized.

FIG. 5B illustrates a corresponding example of the shape of voltage V4 across piezoelectric element 4.

For simplification, the same designations of phases I, II, III, IV, V, and VI according to the on phases of switches K1, K2, and K3 are used. However, the time positions of these phases in the resonance cycle with respect to the minimum and maximum values of the deformation are different.

Thus, at a time t10 corresponding to the maximum deformation (1) of the piezoelectric material in one direction, switch K1 is turned on (switches K2 and K3 being off) and voltage V4 is then equal to voltage Ve during a phase noted II.

At a time t11, when enough power has been stored in element 4, switch K1 is turned off and all the switches are left in the off state during a phase III where the charge remains constant and the voltage across element 4 decreases.

At a time t12 when the voltage across element 4 takes a zero value, switch K3 turns on and shorts element 4. Phase IV remains until a time t13 when the deformation of element 4 is maximum (−1) in the other direction with respect to time t10.

From time t13, all the switches are off. The voltage across element 4 increases back under the effect of its mechanical deformation.

When (time t14) voltage V4 reaches the value desired for voltage Vs, switch K2 is turned on and the power is transferred to load 2 (phase VI).

Phase VI lasts until a time t15 when switch K2 is turned off. Voltage V4 then starts increasing again (phase I) until the end of the cycle (time t10) when it reaches the value of voltage Ve.

The regulation is here performed by adjusting the duration of phase II (time t11).

As for a voltage boost converter, one has, at the level of piezoelectric element 4, three phases (I, III, IV) at constant charge and three phases (II, IV, VI) at constant voltage. Similarly, times at which the switches are turned on when the voltage thereacross is zero (to within junction voltages) are provided.

The detection of the different switching times may use the same techniques as those described hereabove for a boost converter, for example, a timer, a measurement of the output voltage of the voltage across element 4, a detection of the inversion of the current direction, of the deformation direction, etc.

FIG. 6 shows an example of an electric diagram of a buck converter using the principle of FIG. 2.

Switches K1 and K2 are formed of MOS transistors while switch K3 is formed of a diode D3 (anode on the side of electrode 44). The switchings of times t12 and t13 are then automatic, respectively when diode D3 becomes forward biased (time t12) and when the current changes direction under the effect of the inversion of the direction of the deformation of the material (time t13).

According to another embodiment, the structure of the circuit of FIG. 2 is used to form a buck-boost converter. In this case, switches K1, K2, and K3 are all controllable switches (and not diodes for switches K2 and K3). The choice between a boost or buck converter operation is conditioned by the phases of the deformation of the piezoelectric material during which the different switches are on. The forming of a buck-boost converter can be deduced from the embodiments discussed for a buck and for a boost converter.

FIG. 7 very schematically shows another embodiment of DC/DC voltage boost converter. According to this embodiment, the power transmission from element 4 to the load is performed under a voltage Vs-Ve.

As compared with FIG. 4, electrode 44 of element 4 is not connected to terminals 12 and 18 but is connected to the junction point of two switches K4 and K5 coupling terminals 12 and 14. Further, switch K3 couples terminal 12 (positive terminal of voltage Ve) to terminal 42. Thus, to short-circuit element 4, switches K4 and K3 have to be simultaneously turned on.

Switches K4 and K5 are for example MOS transistors M4 and M5, each in parallel with a diode D4, respectively D5 (which may be the intrinsic diode of the transistor or a separate component), the anodes of diodes D4 and D5 being respectively on the side of terminal 44 and on the side of terminal 14. Switch K3 is also, for example, a MOS transistor M3 with a diode in parallel (anode on the side of terminal 12). N-channel or P-channel MOS transistors may be used. P-channel MOS transistors are preferred when the source potential is positive, for example, for switches K3 and K4.

FIGS. 8A and 8B illustrate the operation of the circuit of FIG. 7 as a voltage boost converter.

FIG. 8A illustrates the mechanical deformation of piezoelectric element 4 during a resonance cycle (a period). The deformation scale is normalized.

FIG. 8B illustrates a corresponding example of the shape of voltage V4 across piezoelectric element 4.

The operation of the circuit of FIG. 7 and the discussion of FIGS. 8A and 8B can be deduced from the operation discussed in relation with FIGS. 3A and 3B (the curve shapes are similar).

A difference is that the switches are on two by two. Thus, during phase II (power supply to element 4) at a constant voltage equal to voltage Ve, switches K5 and K3 are on. During phase IV (short-circuit of element 4 and zero voltage), switches K4 and K3 are on. During phase VI (power transfer to load 2), switch K4 and diode D2 are on. Another difference is that phase VI is carried out under a voltage Vs-Ve.

The charge and energy balances during a period are respected and the following can be written (generally, assuming that the voltage across element 4 during phase IV is not necessarily zero but may be set to a value Vb):

$Qe+Qb+Qs=0$; and $Qe*Ve+Qb*Vb+Qs*(Vs-Ve)=0$.

It should be noted that all the circuits of the described embodiments can operate as voltage buck or boost converters.

Among the advantages of the described embodiments, it should be noted that the piezoelectric element does not need to be biased, and that the fact of providing, between each switching, a cycle during which all switches are off takes part in decreasing switching losses, particularly by a switching at the voltage zero.

Various embodiments and variations have been described. Certain embodiments and variations may be combined and other variations and modifications will occur to those skilled in the art. In particular, the selection of the voltage levels depends on the application and on the desired gain (higher or lower than 1). Further, the selection of the piezoelectric material also depends on the application, as well as the shape of the element, to satisfy the voltage, current, and resonance frequency constraints. Once the element has been selected, the time intervals between the different cycles depend on the resonance frequency of the piezoelectric material.

Finally, the practical implementation of the embodiments and variations which have been described is within the abilities of those skilled in the art based on the functional indications given hereabove. In particular, various switch technologies may be used, for example, field-effect transistors (FET), bipolar transistors, IGBT transistors, diodes, GAN-type transistors, relays, microswitches, thyristors, etc.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A DC/DC converter, comprising:
    a first terminal and a second terminal of application of a first voltage;
    a first terminal and a second terminal of supply of a second voltage;
    a piezoelectric element;
    a first switch coupling a first electrode of the piezoelectric element to the first terminal of application of the first voltage;
    a second switch coupling said first electrode of the piezoelectric element to the first terminal of supply of the second voltage; and
    a third switch connecting the first electrode to a second electrode of the piezoelectric element,
    wherein said first, second, and the third switches are cyclically controlled at an approximately constant frequency, having, between each turning-on of any one of the first, second, and third switches, a phase where the first, second, and third switches are off, and
    wherein, in a steady state, the first, second, and third switches are cyclically controlled according to a control cycle comprising the steps of:
        turning off the first, second, and third switches at a first time;
        after the first time, turning on the first switch;
        after turning on the first switch, turning off the first, second, and third switches at a second time;
        after the second time, turning on the third switch;
        after turning on the third switch, turning off the first, second, and third switches at a third time; and
        after the third time, turning on the second switch.

2. The DC/DC converter of claim 1, wherein each turning-on of any one of the first, second, and third switches is performed under an approximately zero voltage thereacross.

3. The DC/DC converter of claim 1, wherein the second electrode of the piezoelectric element is connected to the second terminal of application of the first voltage and to the second terminal of supply of the second voltage.

4. The DC/DC converter of claim 1, wherein a fourth switch couples the second electrode of the piezoelectric element to the second terminal of application of the first voltage and to the second terminal of supply of the second voltage.

5. The DC/DC converter according to claim 1, wherein turning on the third switch approximately starts at a time of maximum deformation of the piezoelectric element, and wherein the DC/DC converter is a boost converter.

6. The DC/DC converter of claim 5, wherein the first time is at a time of maximum deformation of the piezoelectric element.

7. The DC/DC converter of claim 5, wherein regulation of the second voltage is performed by adjusting when the third time occurs.

8. The DC/DC converter of claim 5, wherein the second switch is a diode.

9. The DC/DC converter according to claim 1, wherein the third time occurs approximately at a time of maximum deformation of the piezoelectric element, and wherein the DC/DC converter is a buck converter.

10. The DC/DC converter of claim 9, wherein turning on the first switch approximately starts at a time of maximum deformation of the piezoelectric element.

11. The DC/DC converter of claim 9, wherein regulation of the second voltage is performed by adjusting when the first time occurs.

12. The DC/DC converter of claim 9, wherein the third switch is a diode.

13. The DC/DC converter of claim 1, wherein the control cycle occurs within a single deformation period of the piezoelectric element.

14. A method of controlling a DC/DC switch, comprising at least one piezoelectric element comprising, in steady state, the cyclic phases of:
connecting a first electrode of the piezoelectric element to a first terminal of application of a first DC voltage;

after connecting the first electrode to the first terminal of application of the first DC voltage, disconnecting the piezoelectric element from the first terminal of application of the first DC voltage by placing the piezoelectric element in open circuit;

after disconnecting the piezoelectric element from the first terminal of application of the first DC voltage, shorting the piezoelectric element;

after shorting the piezoelectric element, disconnecting the piezoelectric element from the shorting by placing the piezoelectric element in open circuit;

after disconnecting the piezoelectric element from the shorting, connecting said first terminal of the piezoelectric element to a first terminal of supply of a second DC voltage; and after connecting said first terminal of the piezoelectric element to the first terminal of supply of the second DC voltage, disconnecting the piezoelectric element from the first terminal of supply of the second DC voltage by placing the piezoelectric element in open circuit.

15. The method of claim 14, wherein connecting the first electrode to the first terminal of application of the first DC voltage, shorting the piezoelectric element, and connecting the first terminal of the piezoelectric element to the first terminal of supply of the second DC voltage each occur under an approximately zero voltage of a corresponding connection switch.

16. The method of claim 14, wherein the cyclic phases occur within a single deformation period of the at least one piezoelectric element.

* * * * *